(12) United States Patent
Ishikawa et al.

(10) Patent No.: US 7,881,013 B2
(45) Date of Patent: Feb. 1, 2011

(54) RECORDING TAPE CARTRIDGE

(75) Inventors: Ren Ishikawa, Kanagawa (JP); Minoru Sueki, Odawara (JP)

(73) Assignee: Fujifilm Corporation, Tokyo (JP)

( * ) Notice: Subject to any disclaimer, the term of this patent is extended or adjusted under 35 U.S.C. 154(b) by 576 days.

(21) Appl. No.: 12/016,229

(22) Filed: Jan. 18, 2008

(65) Prior Publication Data
US 2008/0191081 A1 Aug. 14, 2008

(30) Foreign Application Priority Data
Feb. 9, 2007 (JP) ............................. 2007-030200

(51) Int. Cl.
*G11B 23/02* (2006.01)
(52) U.S. Cl. ...................... 360/132; 242/348; 428/847.2
(58) Field of Classification Search ................. 360/132, 360/134; 428/847.2; 242/348
See application file for complete search history.

(56) References Cited

U.S. PATENT DOCUMENTS

| 5,345,355 | A | * | 9/1994 | Teuber et al. | ............ | 242/343.1 |
| 6,835,461 | B1 | * | 12/2004 | Yamagata et al. | ........ | 428/847.2 |
| 7,474,505 | B2 | * | 1/2009 | Hirai | .......................... | 360/134 |
| 7,582,369 | B2 | * | 9/2009 | Kobayashi et al. | .......... | 428/847 |

FOREIGN PATENT DOCUMENTS

| JP | 2005-116163 A | 4/2005 |
| JP | 2006-134406 A | 5/2006 |

* cited by examiner

*Primary Examiner*—Angel A. Castro
(74) *Attorney, Agent, or Firm*—Sughrue Mion, PLLC (57) ABSTRACT

A recording tape cartridge houses a reel including a hub around which recording tape is wound and at least part of which is formed by a resin. The rigidity (modulus of elasticity) y in the radial direction of the hub and the creep deformation ratio x of the recording tape satisfy the conditions of $y \geq 87.3 \exp^{(21.6x)}$ and $x > 0.1$. By setting the rigidity of the reel hub to match the creep deformation ratio of the recording tape so as to satisfy this relationship, creep deformation of the recording tape can be controlled at the smallest cost.

8 Claims, 12 Drawing Sheets

RECORDING TAPE CARTRIDGE

CROSS-REFERENCE TO RELATED APPLICATION

This application claims priority under 35 USC 119 from Japanese Patent Application No. 2007-030200, the disclosure of which is incorporated by reference herein.

BACKGROUND OF THE INVENTION

1. Field of the Invention

The present invention relates to a recording tape cartridge where a reel around which is wound recording tape such as magnetic tape used as a recording and playback medium mainly for computers and the like is housed inside a case.

2. Description of the Related Art

Conventionally, recording tape cartridges have been known where recording tape such as magnetic tape used as a data recording and playback medium for computers and the like is wound around a reel (hub) and the reel is singly housed inside a case. Sometimes the hub around which the recording tape is wound becomes, depending on the rigidity of the hub, deformed (particularly creep-deformed) by the winding constricting force of the recording tape. When the hub becomes deformed in this manner, the recording tape also becomes creep-deformed in accompaniment with the deformation of the hub. For this reason, Japanese Patent Application Publication (JP-A) No. 2005-116163 discloses making the modulus of elasticity (rigidity) in the radial direction of the hub greater than 2 GPa to prevent deformation of the hub, but because a metal ring is disposed on the inner side of the hub, the cost ends up becoming higher by that much.

Further, when the recording tape cartridge is stored for a long period of time in a state where the recording tape is wound around the hub, there is the potential for the tape width direction dimension to change because of creep deformation of the recording tape and for information recording or playback errors to arise when the recording tape cartridge is loaded into a drive device. For this reason, in the technology disclosed in JP-A No. 2006-134406, a reinforcement layer is used to raise the strength of a support body of the recording tape and obtain dimensional stability of the recording tape, but the cost ends up becoming higher by disposing the reinforcement layer.

SUMMARY OF THE INVENTION

In view of these circumstances, it is an object of the present invention to obtain an inexpensive recording tape cartridge where creep deformation of wound recording tape is controlled.

A recording tape cartridge of a first aspect of the present invention which achieves this object includes: a reel including a hub around which recording tape is wound and at least part of the hub being formed by a resin; and a case that rotatably houses the reel, wherein in a state where tension of 15.7 MPa is applied to the recording tape for 50 hours after tension of 0.6 MPa has been applied thereto for 30 minutes in a longitudinal direction of the recording tape in a 50° C. environment, when x (%) represents the creep deformation ratio in the width direction of the recording tape excluding instantaneous strain resulting from the tension of 15.7 MPa and y (MPa) represents the rigidity in the radial direction of the hub, then x and y satisfy the relationship of $y \geq 87.3 \exp^{(21.6x)}$ and $x > 0.1$.

It has become apparent through experiments conducted by the present applicant that the amount of creep deformation of recording tape wound around a reel is dependent not only on the material of the recording tape but also on the rigidity of the reel around which the recording tape is wound. When the rigidity of the reel is low, the amount of creep deformation of the recording tape also becomes larger. Consequently, although it is better for the rigidity of the reel to be high, a metal ring must be disposed on the hub in order to raise the rigidity of the hub, and the cost ends up becoming higher by that much.

For this reason, according to the recording tape cartridge of the first aspect of the invention, $y \geq 87.3 \exp^{(21.6x)}$ is satisfied in the relationship between the creep deformation ratio of the recording tape and the rigidity in the radial direction of the hub, so in the case of recording tape whose creep deformation ratio is relatively small, it becomes alright for the rigidity of the reel around which the recording tape is wound to be small in comparison to recording tape whose creep deformation ratio is relatively large. In other words, by obtaining the optimum reel rigidity to match the creep deformation ratio of the recording tape, creep deformation of the recording tape can be controlled at the lowest possible cost.

Incidentally, the creep deformation ratio of recording tape can be reduced by removing its residual strain, but it is necessary to heat the recording tape in order to reduce the creep deformation ratio. When recording tape is heated, the creep deformation ratio of the recording tape becomes smaller together with the passage of time of heat treatment.

The relationship between the amount of time of heat treatment of recording tape and the creep deformation ratio has nonlinearity and, although this will be described later, the creep deformation ratio of recording tape is significantly reduced by performing a heat treatment of recording tape for 1 day. Additionally, even when the amount of time of heat treatment of recording tape is further extended thereafter, a dramatic effect in the reduction of the creep deformation ratio of the recording tape which can be seen in the initial 1 day cannot be obtained.

Consequently, considering 1 day for the number of days of heat treatment of the recording tape and about 20 hours a day for factory operating time, it is necessary to make the creep deformation ratio x of the recording tape to be larger than 0.1 (creep deformation ratio when the amount of time of heat treatment of the recording tape is 20 hours) because of the relationship between the amount of time of heat treatment of the recording tape and the creep deformation ratio. Consequently, the relational expression between the creep deformation ratio of the recording tape and the rigidity in the radial direction of the hub becomes $y \geq 87.3 \exp^{(21.6x)}$ and $x > 0.1$.

In the recording tape cartridge of the first aspect of the invention, a flange may be disposed on both end portions of the hub, and the hub and at least one of the flanges may be integrally molded.

According to this configuration, the hub and the flange become formed on the same axial center, so in comparison to when the hub and the flange are centered and fixedly attached to each other, the precision of the reel can be raised and the number of working man-hours is also reduced.

In the recording tape cartridge of the first aspect of the invention, the hub may be reinforced by a metal ring made of aluminium.

According to this configuration, the rigidity of the hub can be raised, whereby the amount of creep deformation of the recording tape can be reduced.

In the recording tape cartridge of the first aspect of the invention, a heat treatment may be performed with respect to a support body configuring the recording tape.

According to this configuration, the residual strain of the support body during formation of the support body can be removed by the heat treatment of the support body, and the amount of creep deformation of the recording tape can be reduced.

In the recording tape cartridge of the first aspect of the invention, the recording tape may include a reinforcement layer comprising at least one material selected from a group consisting of metals, half metals, alloys, and oxides and composites (compounds) thereof.

According to this configuration, a reinforcement layer is disposed in the recording tape, so the amount of creep deformation of the recording tape can be reduced and the recording tape can be made into one having excellent dimensional stability. By disposing the reinforcement layer in the recording tape, the cost of the recording tape becomes higher, but the rigidity in the radial direction of the hub can made lower in proportion to the amount of creep deformation of the recording tape becoming smaller, so a resultantly inexpensive recording tape cartridge can be obtained.

As described above, according to the present invention, creep deformation of wound recording tape can be controlled at the lowest possible cost.

DETAILED DESCRIPTION OF THE INVENTION

Below, the best mode for implementing the present invention will be described in detail on the basis of an embodiment shown in the drawings. For the convenience of description, in FIG. 1, arrow A will represent the direction in which a recording tape cartridge 10 is loaded into a drive device and be referred to as a front direction (front side) of the recording tape cartridge 10. Additionally, the direction of arrow B, which is orthogonal to arrow A, will be referred to as a right direction (right side). Further, the direction of arrow C will represent a width direction in the present invention and is the same direction as a height direction and a vertical direction.

Figure 1:
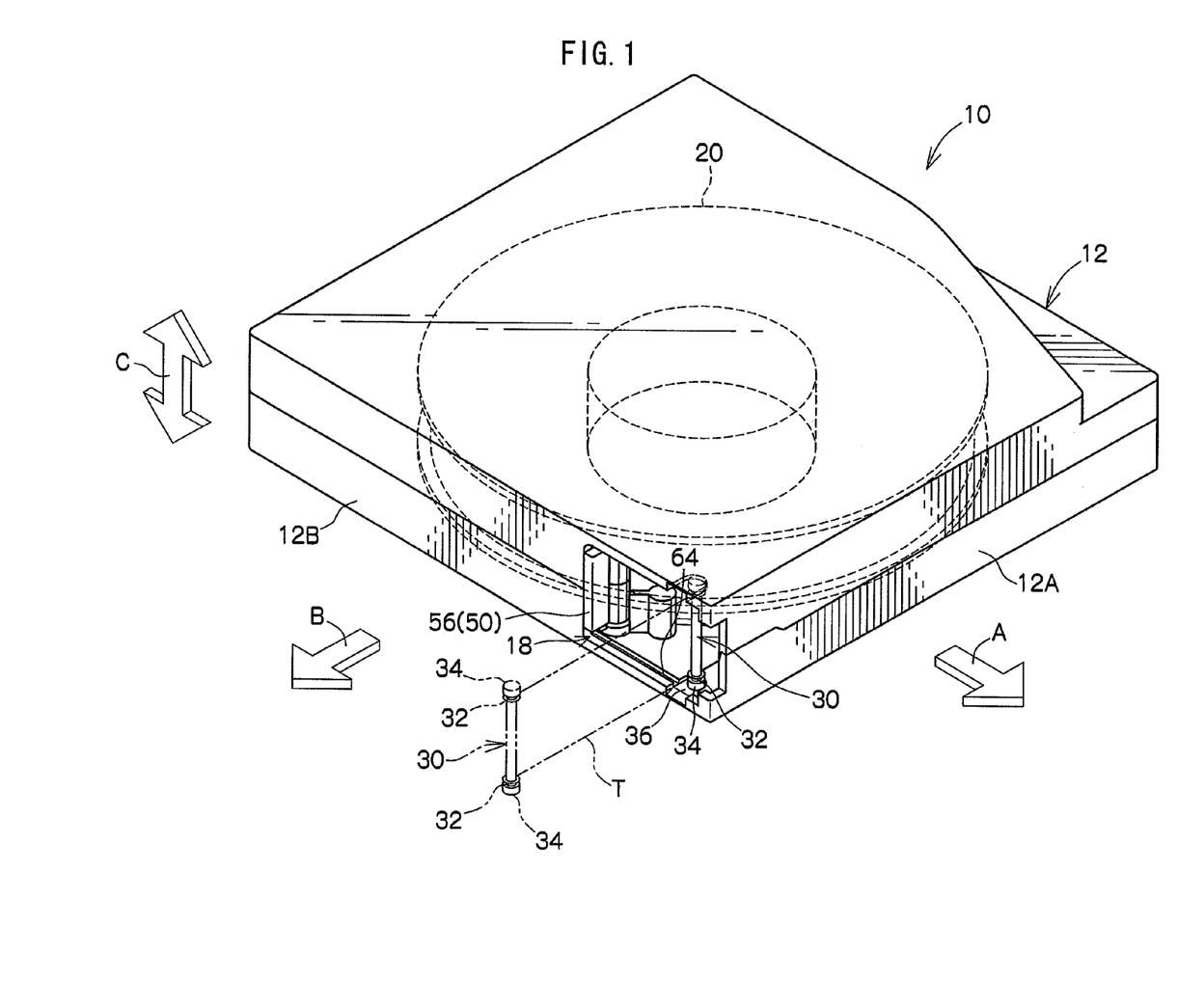
FIG. 1 is a general perspective view of a recording tape cartridge pertaining to an embodiment of the present invention.
Figure 2:
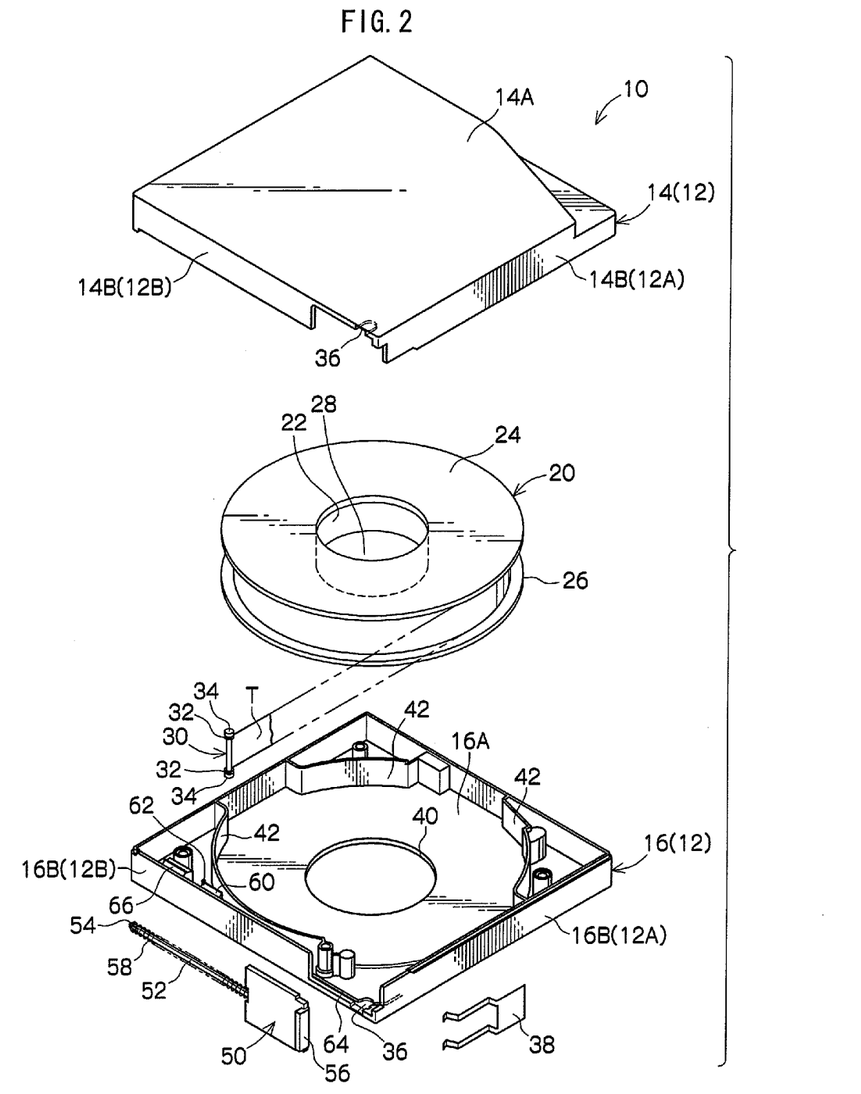
FIG. 2 is a general exploded perspective view of the recording tape cartridge pertaining to the embodiment of the present invention as seen from above.

As shown in FIG. 1 and FIG. 2, the recording tape cartridge 10 includes a case 12 that has a substantially rectangular box-like shape. The case 12 includes an upper case 14 and a lower case 16 made of a plastic such as polycarbonate (PC). The upper case 14 is configured by a top plate 14A and peripheral wall 14B that is disposed upright along the peripheral edge of the top plate 14A. The lower case 16 is configured by a bottom plate 16A and a peripheral wall 16B that is disposed upright along the peripheral edge of the bottom plate 16A. The case 12 is configured as a result of the upper case 14 and the lower case 16 being joined together by ultrasonic welding or with screws in a state where the peripheral wall 14B and the peripheral wall 16B have been brought into contact with each other.

Just one reel 20 is rotatably housed inside the case 12. The reel 20 is configured by a bottomed circular cylinder-shaped reel hub 22 (e.g., thickness of 2.0 mm) that configures the axial center portion of the reel 20, a lower flange 26 that is disposed on the lower end portion of the reel hub 22 and is integrally molded with the reel hub 22 by a polycarbonate resin including 10% glass fiber, and an upper flange 24 that is ultrasonically welded to the upper end portion of the reel hub 22.

Recording tape T such as magnetic tape serving as an information recording and playback medium is wound around the outer peripheral surface of the reel hub 22, and the fluctuation margin in the width direction of the recording tape T wound around the reel hub 22 is limited by the upper flange 24 and the lower flange 26.

A reel gear 27 is annularly formed in the outer surface (undersurface) of the central portion of the lower flange 26, and a gear opening 40 (see FIG. 2) for exposing the reel gear 27 to the outside is disposed in the center portion of the lower case 16. The reel gear 27 exposed from the gear opening 40 meshes with, and is driven to rotate by, a drive gear (not shown) of the drive device, whereby the reel 20 is made capable of relative rotation with respect to the case 12 inside the case 12.

Figure 3:
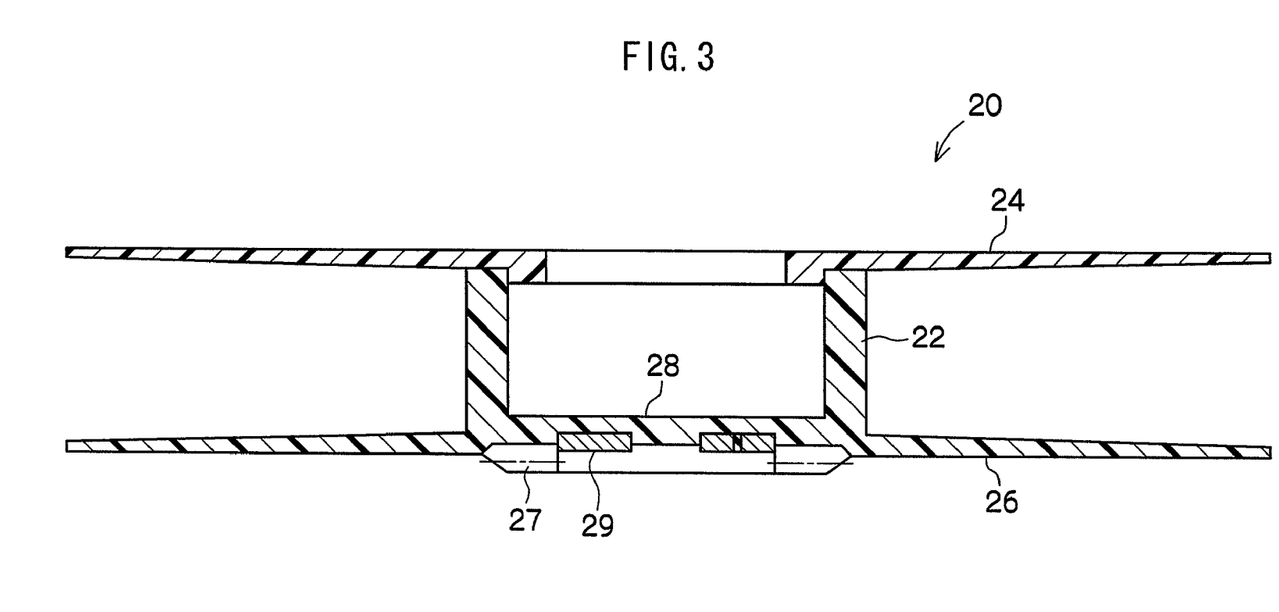
FIG. 3 is a general side sectional view of a reel pertaining to the embodiment of the present invention.

Further, an annular reel plate 29 (see FIG. 3) comprising a magnetic material is fixedly attached, by insert molding or the like, to the undersurface of a bottom wall 28 on the radial direction inner side of the reel gear 27. The reel plate 29 is configured to be attracted and held by the magnetic force of an annular magnet (not shown) of the drive device. Moreover, the reel 20 is held, such that it does not rattle, by a free play limiting wall 42 that is partially disposed on, so as to project from, the inner surfaces of the upper case 14 and the lower case 16 and which serves as an inner wall on a circular locus coaxial with the gear opening 40.

Further, an opening 18 for allowing the recording tape T wound onto the reel 20 to be pulled out is formed in a right wall 12B of the case 12. A leader pin 30 that is locked (gripped) and pulled out by a pullout member of the drive device is fixedly attached to the free end portion of the recording tape T pulled out from the opening 18.

An annular groove 32 is formed in both end portions of the leader pin 30 which project further than the width direction edges of the recording tape T, and hooks of the pullout member lock into these annular grooves 32. For this reason, the hooks or the like do not contact the recording tape T when the pullout member pulls out the recording tape T.

A pair of upper and lower pin holding portions 36 that position and hold the leader pin 30 inside the case 12 is disposed inside the opening 18 in the case 12—that is, in the inner surface of the top plate 14A of the upper case 14 and in the inner surface of the bottom plate 16A of the lower case 16. The pin holding portions 36 have substantially semicircular shapes whose sides in the direction in which the recording tape T is pulled out are open, and both end portions 34 of the leader pin 30 in an upright state are configured to be capable of entering and exiting the pin holding portions 36 from the open sides thereof.

Further, a plate spring 38 is fixedly disposed in the vicinity of the pin holding portions 36, and two-pronged distal end portions of the plate spring 38 are configured to respectively engage with both the upper and lower end portions 34 of the leader pin 30 and hold the leader pin 30 in the pin holding portions 36. It will be noted that when the leader pin 30 enters and exits the pin holding portions 36, the distal end portions of the plate spring 38 appropriately elastically deform to allow movement of the leader pin 30.

Further, the opening 18 is opened and closed by a door 50. The door 50 is formed in a substantially rectangular plate-like shape of a size capable of blocking the opening 18, and groove portions 64 that allow the upper and lower end portions of the door 50 to slidably fit therein are formed in the top plate 14A and the bottom plate 16A inside the opening 18 so that the door 50 can move along the right wall 12B of the case 12.

Further, a shaft 52 is disposed on, so as to project from, the center of the rear end portion of the door 50, and a coil spring 58 is fitted over the shaft 52. Additionally, an enlarged portion 54 that prevents the coil spring 58 from coming off is formed on the rear end of the shaft 52. Further, a support table 60 including a locking portion 62 that locks the rear end of the coil spring 58 fitted over the shaft 52 is disposed on, so as to project from, the lower case 16.

Consequently, the shaft 52 is slidably supported on the support table 60 and the rear end of the coil spring 58 is locked by the locking portion 62, whereby the door 50 is always biased by the biasing force of the coil spring 58 in the direction in which the door 50 blocks the opening 18. It will be noted that it is preferable for a support table 66 that supports the shaft 52 when the opening 18 is open to be projectingly disposed on the rear side of the support table 60.

Further, a tongue 56 for opening and closing the door 50 is disposed on the front end portion of the door 50 so as to project outward. The tongue 56 is configured to engage with an opening/closing member (not shown) of the drive device in accompaniment with the loading of the recording tape cartridge 10 into the drive device. Thus, the door 50 is opened counter to the biasing force of the coil spring 58.

Next, the action of the above recording tape cartridge 10 pertaining to the present embodiment will be described.

As shown in FIG. 1, when the recording tape cartridge 10 having the above-described configuration is not in use (during storage, during transport) where it is not loaded in the drive device (not shown), the opening 18 is blocked by the door 50. Then, when the recording tape T is to be used, the recording tape cartridge 10 is loaded front wall 12A first into the drive device along the direction of arrow A.

Then, the recording tape cartridge 10 is inserted inside an unillustrated bucket, and the opening/closing member (not shown) disposed in the bucket (the drive device) engages with the tongue 56 of the door 50. Then, when the recording tape cartridge 10 moves further in the direction of arrow A in this state, the opening/closing member causes the tongue 56 to move relatively rearward counter to the biasing force of the coil spring 58 (see FIG. 2). Then, the door 50 from which the tongue 56 projects slides rearward inside the groove portions 64 along the right wall 12B to open the opening 18.

In this manner, when the recording tape cartridge 10 is loaded a predetermined depth into the drive device (the bucket) and the opening 18 is completely opened, the bucket housing the recording tape cartridge 10 lowers a predetermined height, and a positioning member (not shown) of the drive device is inserted into a positioning hole portion (not shown) formed in the lower case 16. Thus, the recording tape cartridge 10 is accurately positioned in a predetermined position inside the drive device, and further sliding of the door 50 (movement rearward) is limited.

Further, because of the downward movement of the recording tape cartridge 10 (the bucket), the drive gear (not shown) relatively enters the gear opening 40 (see FIG. 2) and meshes with the reel gear 27 (see FIG. 3) to cause the reel 20 to rise to a predetermined height. Then, in a state where the drive gear and the reel gear 27 are completely meshed, the reel plate 29 is attracted and held by the magnetic force of the annular magnet (not shown) disposed inside the drive gear, whereby the reel 20 is placed in an unlocked state where it becomes relatively rotatable with respect to the case 12 inside the case 12 while the meshing of the reel gear 27 with respect to the drive gear is maintained.

Meanwhile, the pullout member disposed in the drive device enters the case 12 through the opened opening 18 and grips and pulls out the leader pin 30 positioned and held in the pin holding portions 36. At this time, because the recording tape cartridge 10 is accurately positioned inside the drive device, the hooks of the pullout member can be reliably caused to lock into the annular grooves 35 in the leader pin 30. Further, the reel 20 can rotate in accompaniment with the pulling-out of the leader pin 30 because the reel 20 has been released from its rotationally locked state.

When the leader pin 30 that has been pulled out from the opening 18 is housed in a reel hub of a machine reel (not shown) of the drive device, the machine reel and the reel 20 are driven to rotate synchronously, whereby the recording tape T is sequentially pulled out from the case 12 while being taken up on the machine reel, and recording and playback of information is performed by a recording and playback head of the drive device.

Figure 4:
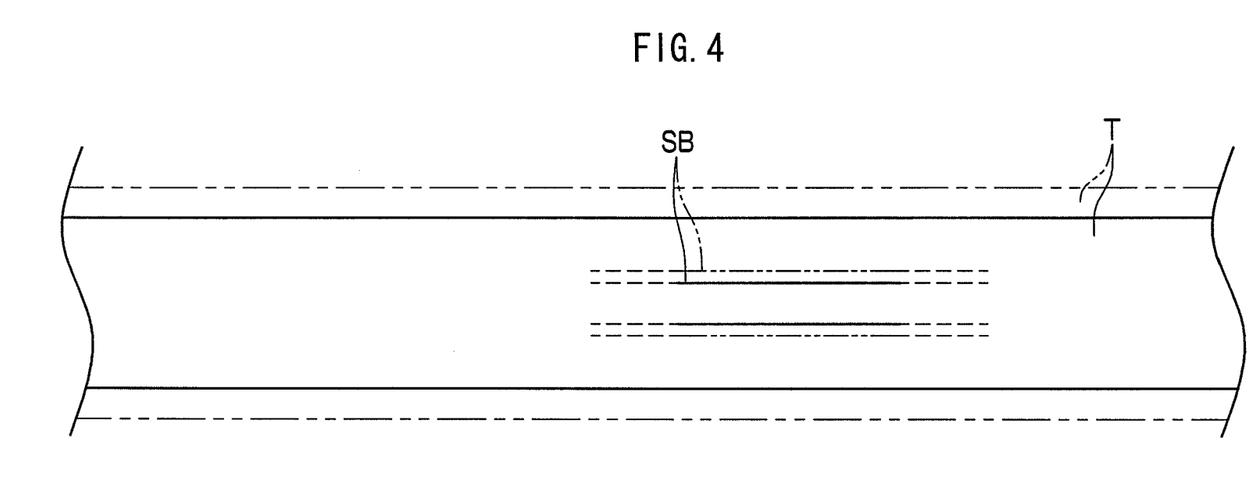
FIG. 4 is an explanatory diagram showing a state where recording tape has become creep-deformed.

Here, as shown in FIG. 4, plural servo bands SB serving as information recording and playback references are disposed on the recording tape T (here, for the convenience of description, two servo bands SB are shown), and recording of information or playback of recorded information is performed using the servo bands SB as a reference by sliding contact of the recording and playback head. Then, the recording tape T for which information recording or playback has ended without error is rewound onto the reel 20 as a result of the drive gear and the machine reel reversely rotating.

When the recording tape T is completely rewound onto the reel 20 and the leader pin 30 is held in the pin holding portions 36, the bucket housing the recording tape cartridge 10 rises a predetermined height, the positioning member (not shown) is pulled out from the positioning hole portion (not shown), the drive gear is pulled out from the gear opening 40, and the drive gear disengages from the reel gear 27. Then, the reel 20 drops to its original height position.

Thereafter, the recording tape cartridge 10 is moved in the opposite direction of the direction of arrow A shown in FIG. 1 by an unillustrated ejecting mechanism and, in accompaniment with this movement, the door 50 is slid by the biasing force of the coil spring 58 in the direction in which the door 50 blocks the opening 18 to completely block the opening 18 (the door 50 returns to its initial state). In this manner, the recording tape cartridge 10 whose opening 18 has been blocked is completely ejected from the inside of the drive device (the bucket).

Incidentally, when the recording tape cartridge 10 is stored for a long period of time in a state where the recording tape T is wound around the reel hub 22, the dimension of the recording tape T changes because of creep deformation of the recording tape T. It is desirable for the amount of creep deformation of the recording tape T to be small in both its MD (width direction) and TD (longitudinal direction) directions.

However, whereas when the recording tape T stretches in its longitudinal direction, information recorded on the recording tape T can be read by changing the reading timing of the recording and playback head of the drive device, when the width direction dimension of the recording tape T changes, as shown in FIG. 4, sometimes problems arise, such as the positions of the servo bands SB shifting (from the hypothetical lines to the solid lines) and recorded information cannot be read. For this reason, it is desirable to reduce the amount of creep deformation at least in the width direction of the recording tape T.

First, in the present embodiment, using recording tapes T having a length of 1 m and different creep characteristics, in a state where tension of 15.7 MPa is applied to the recording tapes T for 50 hours after tension of 0.6 MPa has been applied thereto for 30 minutes in the longitudinal direction of the recording tapes T in a 50° C. environment, the creep deformation ratio in the width direction of each of the recording tapes T (below, sometimes simply called "creep deformation ratio of the recording tapes T") excluding instantaneous strain when the tension of 15.7 MPa is applied thereto (an example of an acceleration test corresponding to long-term storage) is determined.

The creep characteristic of the recording tape T also differs depending on the rigidity and the like of a non-magnetic support body 90 (see FIG. 5) configuring the recording tape T, but in the present embodiment, as one example, the creep deformation ratio is changed by changing the amount of residual strain inside the support body 90 according to the amount of time of a heat treatment of the support body 90 (where the support body 90 is heated at a temperature less than the glass transition temperature of the support body 90 and thereafter gradually cools to room temperature) (residual strain inside the support body 90 is removed by performing a heat treatment, so that the creep deformation ratio becomes smaller).

Additionally, in a state where tension of 15.7 MPa is applied to the recording tape T for 50 hours after tension of 0.6 MPa has been applied thereto for 30 minutes in the longitudinal direction of the recording tape T in a 50° C. environment, when x (%) represents the creep deformation ratio of the recording tape T excluding instantaneous strain when the tension of 15.7 MPa is applied thereto, values where x equaled 0.03%, 0.07% and 0.15% were obtained depending on the creep characteristic of the recording tape T.

Figure 6:
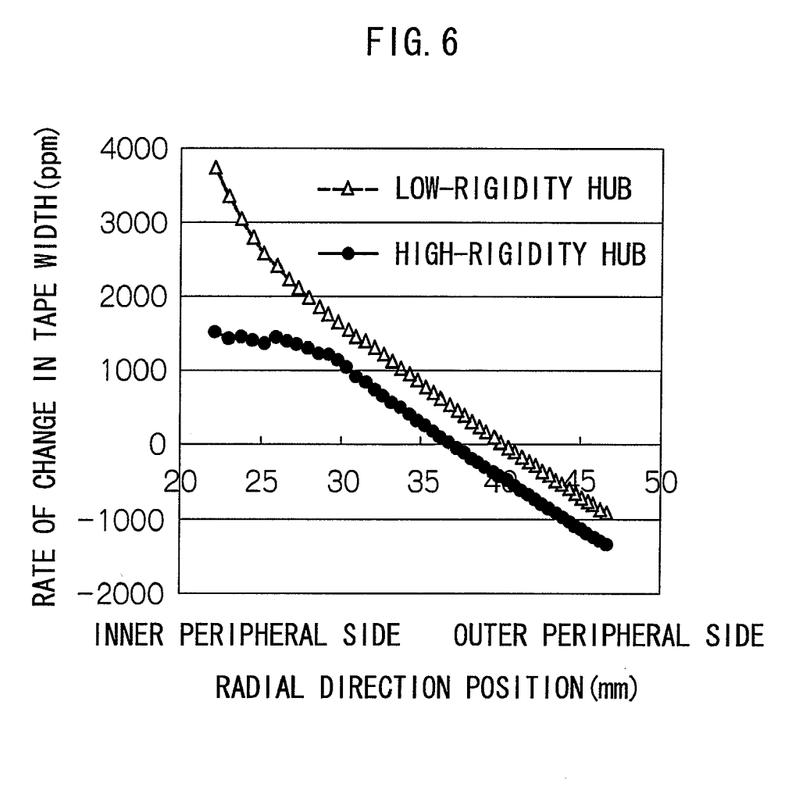
FIG. 6 is a graph showing the results of determining the rate of change in the tape width of recording tape when a low-rigidity reel hub and a high-rigidity reel hub are used.

In FIG. 6, "△" represents when a low-rigidity reel hub was used, "●" represents when a high-rigidity reel hub was used, and the rate of change in the tape width of the recording tape T is determined by a predetermined length from the outer peripheral side of the recording tape T wound around the reel hub 22 to the inner peripheral side (radial direction position of the reel hub 22).

In the present embodiment, the rate of change in the tape width is determined from the amount of deformation in the width direction of the servo band distance (2858 μm) for linear tape-open (LTO) (rate of change in tape width=((inter-servo band distance dimension after deformation−inter-servo band distance dimension before deformation)/2858)×106). It will be noted that the inner peripheral side of the recording tape T wound around the reel hub 22 is the side that faces the reel hub 22.

According to FIG. 6, it will be understood that the rate of change in the tape width of the recording tape T gradually becomes larger closer to the reel hub 22 and that, in the vicinity of the outer peripheral surface of the reel hub 22 (wind-around amount of recording tape T: 50 to 100 m), the rate of change in the tape width of the recording tape T is affected by the rigidity in the radial direction of the reel hub 22.

In other words, even with the same recording tape T, the rate of change in the tape width ends up being different depending on the rigidity in the radial direction of the reel hub 22 around which the recording tape T is wound. That is, whereas in the low-rigidity reel hub 22, the rate of change in the tape width drastically becomes larger in the vicinity of the outer peripheral surface of the reel hub 22, in the high-rigidity reel hub 22, it becomes possible to control this change.

Incidentally, in recording tape whose recording capacity is a 10 TB level, it is presumed that the track pitch will be 10,000 TPI (tracks per inch). In other words, the track pitch is about 2.5 μm. For this reason, when the cumulative amount of change in width from the servo bands SB serving as references is within 1 track width (within the range of 2.5 μm) from the outer peripheral side of the recording tape T wound around the reel hub 22 to the inner peripheral side, the recording and playback head does not mistakenly read the next track information.

Consequently, the rate of change in the tape width from the outer peripheral side of the recording tape T wound around the reel hub 22 to the inner peripheral side is made equal to or less than ±400 ppm, for example. When 400 ppm is converted at an LTO servo band pitch (2858 μm), 2858×(400/106)=1.14 μm, so ±400 ppm becomes ±1.14 μm, or a range of 2.28 μm (<2.5 μm).

Figure 7A:
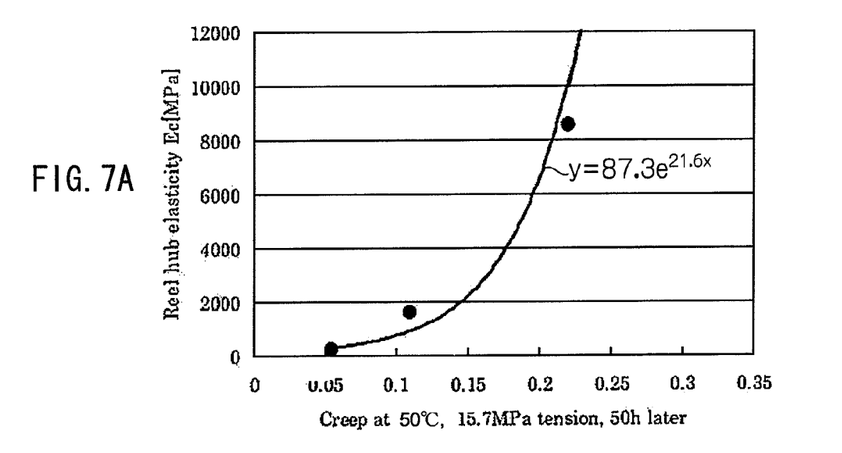
FIGS. 7A and 7B are graphs showing the relationship between the creep deformation ratio of recording tape and the rigidity in the radial direction of a reel hub.

For this reason, with respect to each of the recording tapes T whose creep deformation ratios x equal 0.03%, 0.07%, and 0.15%, calculation is repeatedly performed by changing the rigidity (modulus of elasticity: y) in the radial direction of the reel hub 22 so as to become a desired rate of change in tape width (equal to or less than ±400 ppm). Additionally, when the relationship between x and y is approximated exponentially by the least square method from the determined data ("●" shown in FIG. 7A), the following relational expression is obtained.

$$y \geq 87.3 \exp^{(21.6x)} \qquad \text{(expression 1)}$$

Here, it is best for the creep deformation ratio x in the width direction of the recording tape T to be as small as possible, but it is necessary to set a limit in consideration of the production efficiency of the recording tape T. The creep deformation ratio of the recording tape T can be reduced by removing residual strain during production, but it is necessary to heat the recording tape T in order to remove residual strain.

Figure 8:
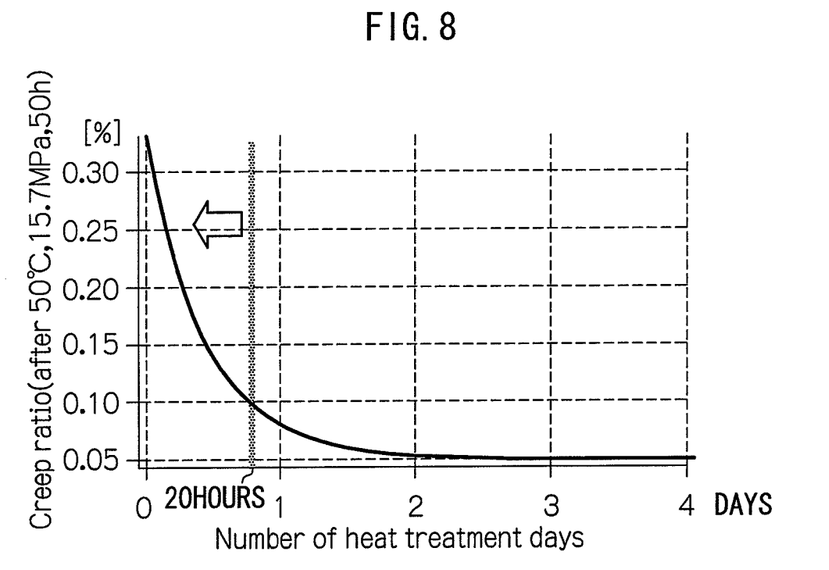
FIG. 8 is a graph showing the relationship between the creep deformation ratio of recording tape and an amount of heat treatment time.

In FIG. 8, there is shown the relationship between the amount of time of heat treatment of the recording tape T and the creep deformation ratio of the recording tape T. It will be understood that the relationship between both has nonlinearity and that the creep deformation ratio of the recording tape T is significantly reduced by performing a heat treatment of the recording tape T for about 1 day. Additionally, even when the amount of time (number of days) is further extended (1 day to 4 days) a dramatic effect in the reduction of the creep deformation ratio of the recording tape T which can be seen in the initial 1 day cannot be obtained.

Figure 7B:
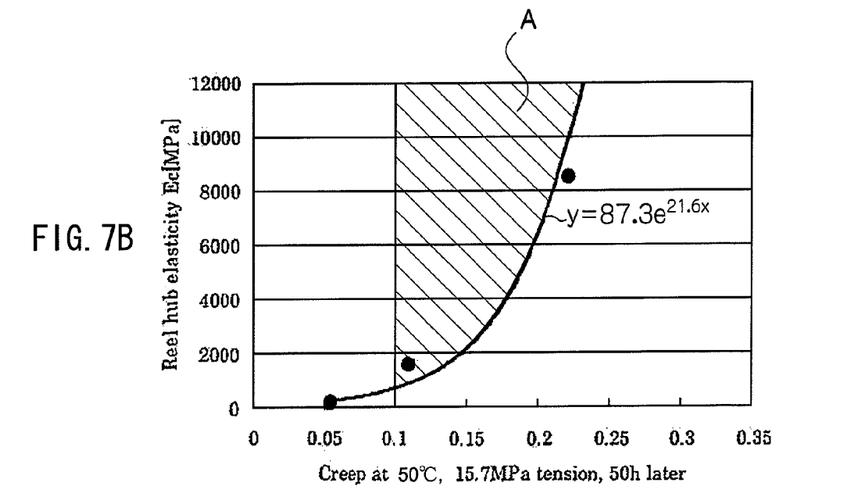

Consequently, considering 1 day for the number of days of heat treatment of the recording tape T and about 20 hours a day for factory operating time, the creep deformation ratio x of the recording tape T becomes about 0.1. For this reason, it is necessary to make the creep deformation ratio x larger than 0.1. Consequently, the above expression 1 becomes as follows (region A shown in FIG. 7B).

$$y \geq 87.3 \exp^{(21.6x)} \text{ and } x > 0.1 \quad \text{(expression 2)}$$

Additionally, when the creep deformation ratio x of the recording tape T and the rigidity y in the radial direction of the reel hub 22 satisfy the condition of expression 2 (region A), in the case of recording tape T whose creep deformation ratio is relatively small, it becomes alright for the rigidity in the radial direction of the reel hub 22 around which the recording tape T is wound to be low in comparison to recording tape T whose creep deformation ratio is relatively large. In other words, by obtaining the optimum rigidity of the reel hub 22 to match the creep deformation ratio of the recording tape T, creep deformation of the recording tape T can be controlled at the lowest possible cost.

Incidentally, the rigidity in the radial direction of the reel hub 22 can be defined as "rigidity=external force (MPa)/amount of strain" from the amount of strain in the radial direction of the reel hub 22 when an even external force is applied at room temperature (23° C. and 50% relative humidity environment) to the outer periphery of the reel hub 22.

In the present embodiment, the reel hub 22 and the lower flange 26 are integrally molded, but the low-rigidity type reel hub 22 is, as one example, formed by just a synthetic resin, and when a polycarbonate resin including 10% glass fiber is injection-molded to form a reel hub 22 with a thickness of 2.0 mm, then the rigidity in the radial direction of the reel hub 22 is about 400 MPa.

Figure 9:
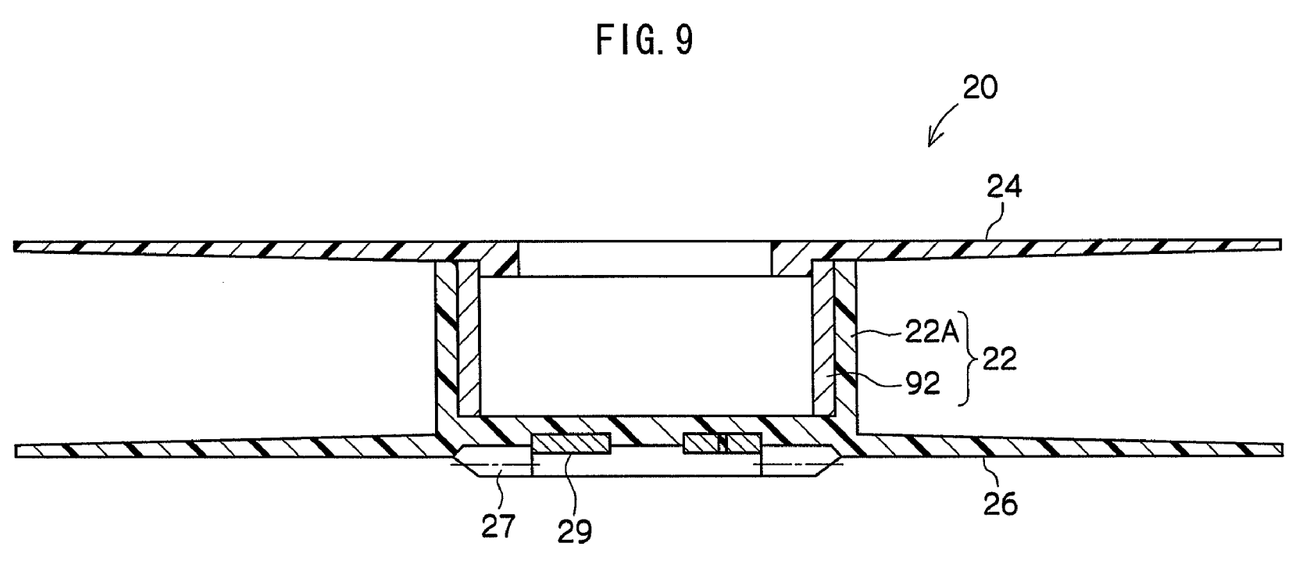
FIG. 9 is a general side sectional view showing a modification of the reel pertaining to the embodiment of the present invention.

On the other hand, in the high-rigidity type reel hub 22, as one example, as shown in FIG. 9, a circular cylinder portion 92 made of aluminium and having a thickness of 1.0 mm is disposed by insert molding on the inner radial side of the reel hub 22, so that the reel hub 22 is given a two-layer structure comprising the circular cylinder portion 92 and an outer resin layer 22A. Additionally, the rigidity in the radial direction of the reel hub 22 in this case is about 3,000 MPa.

Figure 10A:
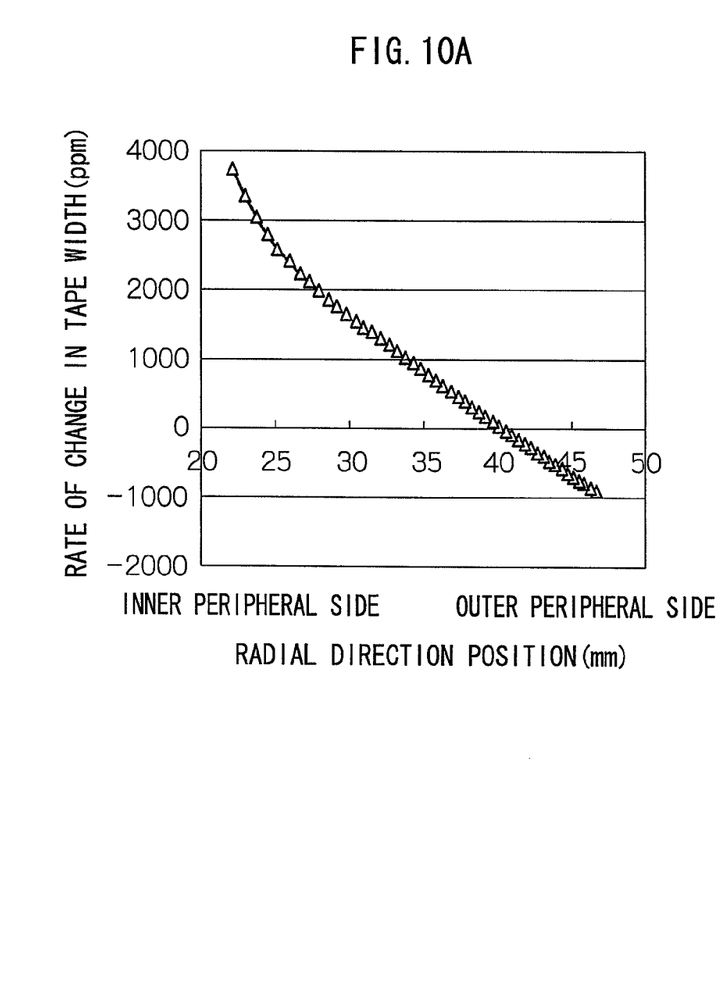
FIG. 10A is a graph showing the result of measuring the rate of change in the tape width of recording tape whose creep deformation ratio is 0.33%.

In FIG. 10A, there are plotted the results of measuring the rate of change in the tape width of the recording tape T whose creep deformation ratio is 0.33% from the outer peripheral side of the recording tape T to the inner peripheral side in a state where the recording tape T is wound around the low-rigidity type reel hub 22 (400 MPa).

In the case of the recording tape T whose creep deformation ratio is 0.33%, in order to satisfy the condition of expression 2, as shown in FIG. 7B, it is necessary for the rigidity in the radial direction of the reel hub 22 to be equal to or greater than 108,809 MPa. For example, even when the circular cylinder member 92 of the reel hub 22 is made of stainless steel having a thickness of 1.0 mm, the rigidity in the radial direction of the reel hub 22 is about 12,000 MPa. In other words, in actuality, unless an unrealistic level of rigidity of the reel hub 22 is reached, the rate of change in the tape width cannot be satisfied.

Figure 10B:
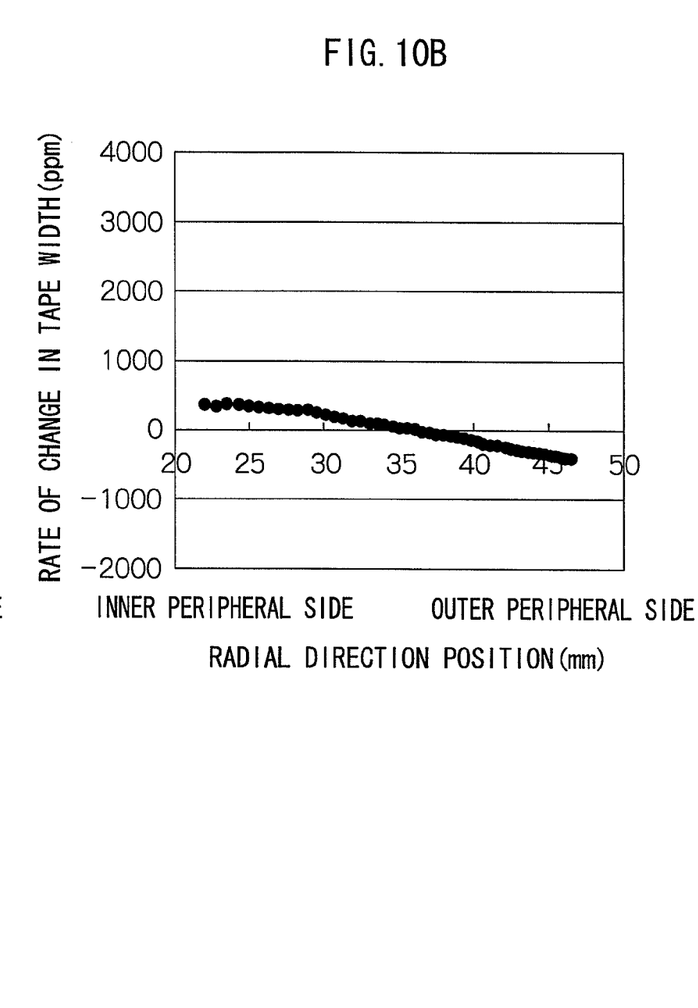
FIG. 10B is a graph showing the result of measuring the rate of change in the tape width of recording tape whose creep deformation ratio is 0.11%.

On the other hand, in FIG. 10B, there are plotted the results of measuring the rate of change in the tape width of the recording tape T whose creep deformation ratio is 0.11% from the outer peripheral side of the recording tape T to the inner peripheral side in a state where the recording tape T is wound around the high-rigidity type reel hub 22 (3,000 MPa).

In the case of the recording tape T whose creep deformation ratio is 0.11%, in order to satisfy the condition of expression 2, as shown in FIG. 7B, it suffices for the rigidity in the radial direction of the reel hub 22 to be equal to or greater than 1,500 MPa, and because the rigidity in the radial direction of the reel hub 22 is sufficient with respect to the creep deformation ratio of the recording tape T, the rate of change in the tape width becomes smaller.

In the case of the recording tape T whose creep deformation ratio is equal to or less than 0.15%, it suffices for the rigidity in the radial direction of the reel hub 22 to be equal to or less than 2,000 MPa, so by changing the content of the glass fiber in the synthetic resin and the thickness of the reel hub 22, the reel hub 22 can be formed by just a synthetic resin. In order to obtain a reel hub 22 whose rigidity is high, it is necessary to use a metal ring and the cost ends up becoming higher, but as mentioned previously, by obtaining the optimum rigidity of the reel hub 22 to match the creep deformation ratio of the recording tape T, even the low-rigidity reel hub 22 becomes sufficiently usable, and creep deformation of the recording tape T can be controlled at the lowest possible cost.

Incidentally, in a reel structure where the reel hub 22 and one of the flanges (here, the lower flange 26) are integrally molded, the reel hub 22 and the lower flange 26 become formed on the same axial center, so it is not necessary to center and fixedly attach them to each other in comparison to when the reel hub 22 and the lower flange 26 are molded individually, and the precision of the reel can be raised and the number of working man-hours can also be reduced.

Figure 11:
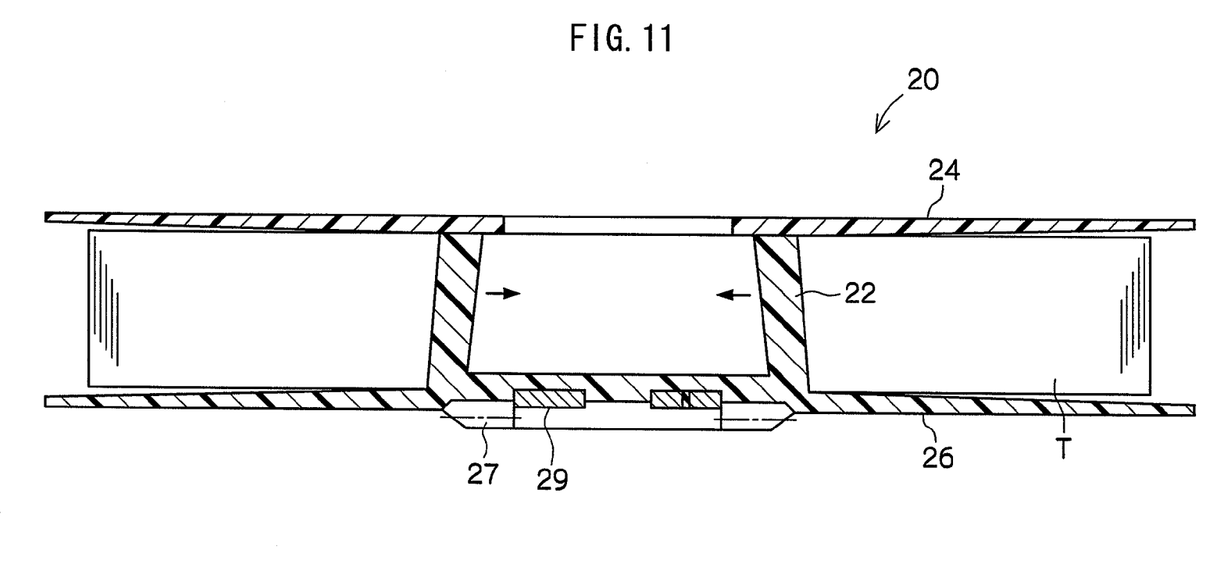
FIG. 11 is a general side sectional view showing a state where a reel hub has become deformed.

However, in such a reel structure, it is easy for an undulating phenomenon (seaweed-like deformation) to occur in the recording tape T. In other words, the reel hub 22 is hollow and, in comparison to the rigidity of the reel hub 22 on the side of the lower flange 26 that has a circular plate-like shape, the rigidity on the upper end portion side is low and the rigidity becomes uneven in the height direction of the reel hub 22, so under a high-temperature high-humidity environment (e.g., 2 weeks in a 60° C. and 90% relative humidity environment), as shown in FIG. 11, the undulating phenomenon arises as a result of the reel hub 22 collapsing into a slanted shape when seen in side sectional view because of creep deformation.

Figure 12A:
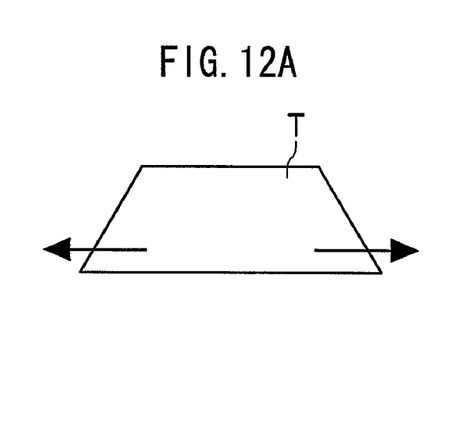
FIGS. 12A and 12B are explanatory diagrams describing the reason recording tape becomes deformed.
Figure 12B:
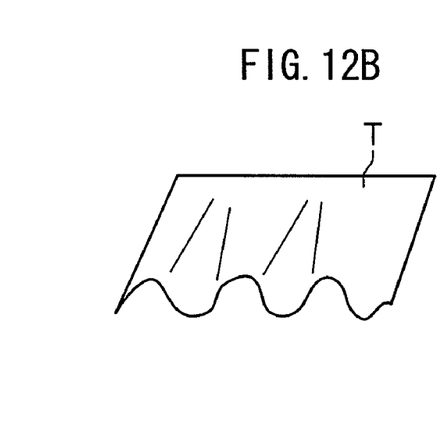

When the reel hub 22 collapses in this manner, the winding surface of the recording tape T also moves along this slanting and creep deformation occurs also in the recording tape T itself, so as shown in FIG. 12A, stretching along the slanted shape of the reel hub 22 occurs in the recording tape T, and the side of the recording tape T facing the lower flange 26 becomes stretched even more. Were one to try and stretch the recording tape T with a certain tension so as to align the lengths of the recording tape T on the side facing the lower flange 26 and the side facing the upper flange 24, seaweed-like undulation would occur in the tape edge of the recording tape T on the side facing the lower flange 26 (FIG. 12B).

In order to reduce this undulating phenomenon, it becomes necessary to raise the rigidity in the radial direction of the reel hub 22 and control slanted collapse of the reel hub 22 or, when slanting collapse has occurred, to control creep deformation of the recording tape T, but because of the optimum combination of the creep deformation ratio of the recording tape T and the rigidity in the radial direction of the reel hub 22 according to the present embodiment, it becomes possible to also reduce the undulating phenomenon in the tape edge which occurs easily when the recording tape T is stored for a long period of time.

Figure 5:
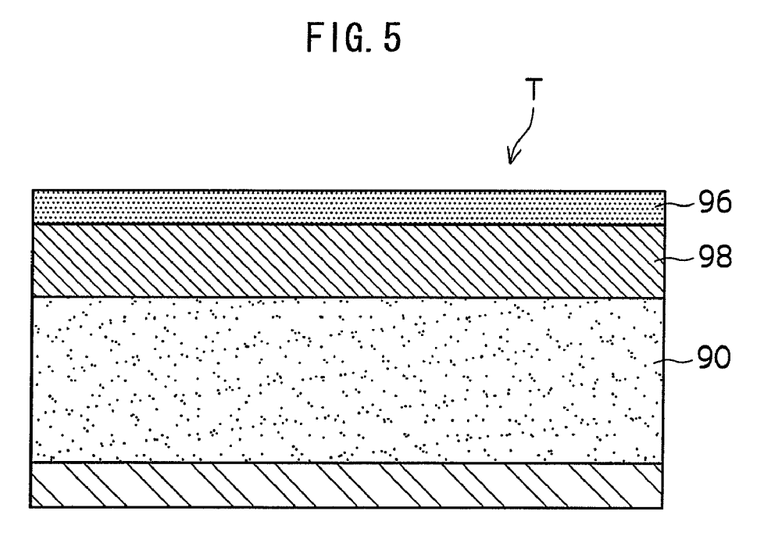
FIG. 5 is a cross-sectional view of the recording tape.

Here, as shown in FIG. 5, a reinforcement layer 98 may be disposed between the support body 90 and a magnetic body 96 in the recording tape T. Thus, the amount of creep deformation of the recording tape T itself can be reduced, and the recording tape T can be made into one having excellent dimensional stability. By disposing the reinforcement layer 98 in the recording tape T, the cost of the recording tape T becomes higher, but the rigidity in the radial direction of the reel hub 22 can made lower in proportion to the amount of creep deformation of the recording tape T becoming smaller, so a resultantly inexpensive recording tape cartridge 10 can be obtained.

The reinforcement layer 98 comprises a metal material selected from metals, half metals, alloys, and oxides and composites (compounds) thereof. Specifically, examples thereof include metals such as Al, Cu, Zn, Sn, Ni, Ag, Co, Fe, and Mn, and half metals such as Si, Ge, As, Sc, and Sb. Examples of alloys of these metals and half metals include Fe—Co, Fe—Ni, Co—Ni, Fe—Co—Ni, Fe—Cu, Co—Cu, Co—Au, Co—Y, Co—La, Co—Pr, Co—Gd, Co—Sm, Co—Pt, Ni—Cu, Mn—Bi, Mn—Sb, Mn—Al, Fe—Cr, Co—Cr, Ni—Cr, Fe—Co—Cr, and Ni—Co—Cr. Oxides of these metals, half metals and alloys may be easily obtained by introducing oxide gas during deposition, for example.

Further, examples of composites (compounds) of these metals, half metals and alloys include carbides, nitrides, oxynitrides, oxycarbides, and oxysilicides of metals, half metals and alloys, and also composites (compounds) of the aforementioned oxides and metals, half metals or alloys. Specifically, examples include Fe—Si—O, Si—C, Si—N, Cu—Al—O, Si—N—O, and Si—C—O. Examples of preferable metal materials include oxides of metals, half metals and alloys. Any method may be used to form the reinforcement layer 98, but vacuum deposition is common and, in addition to this, sputtering or ion plating can be used.

In the present embodiment, the reel hub 22 and the lower flange 26 are integrally molded, but the reel hub 22 and the upper flange 24 may also be integrally molded, and the reel hub 22, the upper flange 24 and the lower flange 26 may also be integrally molded. Moreover, the reel hub 22 may also be formed in an independent state, and the upper flange 24 and the lower flange 26 may be fixedly attached to both end portions of the reel hub 22.

Further, here, an example has been described where the reel 20 was applied to the recording tape cartridge 10 configured such that a single reel was housed inside the case 12, but the present invention is not limited to this; for example, the reel 20 may also be applied to a two-reel type of recording tape cartridge that houses two reels inside a case.

What is claimed is:

1. A recording tape cartridge comprising:
   a reel including a hub around which recording tape is wound and at least part of the hub being formed by a resin; and
   a case that rotatably houses the reel,
   wherein in a state where tension of 15.7 MPa is applied to the recording tape for 50 hours after tension of 0.6 MPa has been applied thereto for 30 minutes in a longitudinal direction of the recording tape in a 50° C. environment, when x (%) represents the creep deformation ratio in the width direction of the recording tape excluding instantaneous strain resulting from the tension of 15.7 MPa and y (MPa) represents the rigidity in the radial direction of the hub, then x and y satisfy the relationship of $y \geq 87.3 \exp^{(21.6x)}$ and $x > 0.1$.

2. The recording tape cartridge of claim 1, wherein a flange is disposed on both end portions of the hub, and the hub and at least one of the flanges are integrally molded.

3. The recording tape cartridge of claim 1, wherein the hub is reinforced by a metal ring made of aluminium.

4. The recording tape cartridge of claim 1, wherein heat treatment is performed to a support body configuring the recording tape.

5. The recording tape cartridge of claim 1, wherein the recording tape includes a reinforcement layer comprising at least one material selected from a group consisting of metals, half metals, alloys, and oxides and composites thereof.

6. The recording tape cartridge of claim 5, wherein the recording tape includes a support body layer and a magnetic body layer and the reinforcement layer is disposed between the support body layer and the magnetic body layer of the recording tape.

7. The recording tape cartridge of claim 1, wherein the creep deformation ratio of the recording tape is equal to or less than 0.15%, and the rigidity in the radial direction of the reel hub is equal to or less than 2,000 MPa.

8. The recording tape cartridge of claim 1, wherein the creep deformation ratio of the recording tape is equal to or less than 0.15%, and the reel hub is formed by entirely from a synthetic resin containing glass fiber therein.

* * * * *